(12) United States Patent
Kron et al.

(10) Patent No.: US 6,509,384 B2
(45) Date of Patent: Jan. 21, 2003

(54) CHEMICAL PRODUCT AND METHOD

(75) Inventors: Anna Kron, Sundsvall (SE); Peter Sjögren, Sundsvall (SE); Odd Bjerke, Sundsvall (SE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/840,963

(22) Filed: Apr. 25, 2001

(65) Prior Publication Data

US 2001/0051666 A1 Dec. 13, 2001

Related U.S. Application Data

(60) Provisional application No. 60/200,340, filed on Apr. 28, 2000.

(30) Foreign Application Priority Data

Apr. 28, 2000 (EP) .......................................... 00850076.1

(51) Int. Cl.⁷ .............................. C08J 9/32; B01J 13/02
(52) U.S. Cl. ........................................... 521/56; 521/60
(58) Field of Search ...................................... 521/56, 60

(56) References Cited

U.S. PATENT DOCUMENTS

| | | | |
|---|---|---|---|
| 3,615,972 A | 10/1971 | Morehouse | 156/79 |
| 3,787,327 A | 1/1974 | Emrick | 252/316 |
| 5,536,756 A | 7/1996 | Kida | 521/56 |

FOREIGN PATENT DOCUMENTS

| | | | | |
|---|---|---|---|---|
| EP | 0486080 A2 | 5/1992 | ............. | C08F/2/18 |
| GB | 989264 | 4/1965 | | |
| JP | 62-286534 | 12/1987 | | |
| WO | WO99/46320 | 9/1999 | ............. | C08J/9/20 |

OTHER PUBLICATIONS

Patent Abstracts of Japan, Publication No. 09019635, Appln. No. 08153855, Date of Publication of application Jan. 21, 1997.
English translation of International Laid–Open No. WO99/43758, International Laid Open Date Sep. 2, 1999.
English translation of Laid–Open No. 2000–24488, Laid-Open Date Jan. 25, 2000.

*Primary Examiner*—Morton Foelak
(74) *Attorney, Agent, or Firm*—David J. Serbin

(57) ABSTRACT

The invention relates to thermally expandable microspheres comprising a thermoplastic polymer shell and a propellant entrapped therein, wherein said polymer shell is made of a homo- or co-polymer from ethylenically unsaturated monomers comprising more than 85 wt % of nitrile containing monomers and said propellant comprises at least 50 wt % of isooctane. The invention further relates to preparation and use of expandable microspheres, a composition comprising expandable microspheres and articles comprising foamed material containing expanded microspheres.

20 Claims, No Drawings

CHEMICAL PRODUCT AND METHOD

This application claims the benefit of U.S. provisional application Ser. No. 60/200,340 filed Apr. 28, 2000.

The present invention relates to expandable thermoplastic microspheres comprising a shell and a propellant entrapped therein, a method of their preparation, use of such microspheres as a foaming agent, expandable compositions comprising such microspheres, and articles comprising foamed material containing expanded microspheres.

Expandable thermoplastic microspheres comprising a thermoplastic polymer shell and a propellant entrapped therein are commercially available under the trademark Expancel™ and are used as a foaming agent in many different applications, such as in elastomers, thermoplastic elastomers, polymers, putty, underbody coating, plastisols, printing ink, paper, explosives and cable insulations. Microspheres and their production are also described in detail in, for example, U.S. Pat. No. 3,615,972, EP 486080 JP 87-286534, WO 99/46320 and WO 99/43758.

In such microspheres, the propellant is normally a liquid having a boiling temperature not higher than the softening temperature of the thermoplastic polymer shell. Upon heating, the propellant evaporates to increase the internal pressure at the same time as the shell softens, resulting in significant expansion of the microspheres, normally from about 2 to about 5 times their diameter. The temperature at which the expansion starts is called $T_{start}$, while the temperature at which maximum expansion is reached is called $T_{max}$. When $T_{max}$ is exceeded the propellant has been released through the polymer shell to such an extent that the microspheres start to collapse.

It is generally desirable to achieve as high degree of expansion of the microspheres as possible, preferably when included as a foaming agent in thermoplastics, rubber or thermoplastic elastomers. In many applications, for example when included in compositions to be worked at high temperature without risk for unintentional expansion, it is also desirable that $T_{start}$ is comparatively high. In many cases is it also advantageous with a high $T_{max}$ as the start of collapse of the microspheres during expansion then occurs later.

Thus, it is an object of the present invention to provide thermally expandable microspheres with high values for $T_{start}$ and $T_{max}$, and high expansion capability at high temperatures.

It is another object of the invention to provide expandable compositions including thermally expandable microspheres, which compositions can be worked at a comparatively high temperature without unintentional expansion.

It is still another object of the invention to provide foamed materials containing expanded microspheres.

It has been found that these objects can be achieved by microspheres as defined in the appended claims.

More specifically, the invention concerns thermally expandable microspheres comprising a thermoplastic polymer shell and a propellant entrapped therein, wherein said polymer shell is made of a homo- or co-polymer from ethylenically unsaturated monomers comprising more than 85 wt %, preferably more than 92 wt %, more preferably more than 95 wt %, most preferably more than 98 wt % of nitrile containing monomers, or even substantially consisting of nitrile containing monomers, while said propellant comprises at least, suitably more than 50 wt %, preferably more than 55 wt %, more preferably more than about 60 wt % most preferably more than about 70 wt % of isooctane, or even substantially consists of isooctane. The term isooctane as used herein refers to 2,2,4-trimethyl pentane.

Preferably $T_{start}$ is within the range from about 80 to about 200° C., more preferably from about 115 to about 200° C., most preferably from about 130 to about 200° C., while $T_{max}$ preferably is higher than 190° C., most preferably higher than 200° C. Normally $T_{max}$ does not exceed 300° C. The microsphere bulk density after heating to 220° C. is preferably lower than 15 g/l, most preferably lower than 12 g/l.

The nitrile containing monomers used for the polymer shell are preferably mainly selected from one or more of acrylo nitrile, methacrylo nitrile, α-chloroacrylo nitrile, α-ethoxyacrylo nitrile, fumaro nitrile, croto nitrile, most preferably acrylo nitrile, methacrylo nitrile or a mixture thereof. If other ethylenically unsaturated monomers are present, preferably in an amount from 0 to about 5 wt %, most preferably from 0 to about 2 wt %, they are preferably selected from one or more of acrylic esters such as methylacrylate or ethyl acrylate, methacrylic esters such as methyl methacrylate, isobornyl methacrylate or ethyl methacrylate, vinyl chloride, vinylidene chloride, vinyl pyridine, vinyl esters such as vinyl acetate, styrenes such as styrene, halogenated styrenes or α-methyl styrene, butadiene, isoprene, chloroprene. The softening temperature of the polymer shell, in most cases essentially corresponding to its glass transition temperature ($T_g$), is preferably within the range from about 80 to about 200° C., more preferably from about 115 to about 200° C. most preferably from about 130 to about 200° C. Preferably the polymer shell constitutes from about 70 to about 90 wt %, most preferably from about 75 to about 85 wt % of the total microsphere.

It may sometimes be desirable that the monomers for the polymer shell also comprise crosslinking multifunctional monomers, such as one or more of divinyl benzene, ethylene glycol di(meth)acrylate, diethylene glycol di(meth)acrylate, triethylene glycol di(meth)acrylate, propylene glycol di(meth)acrylate, 1,4-butanediol di(meth)acrylate, 1,6-hexanediol di(meth)acrylate, glycerol di(meth)acrylate, 1,3-butanediol di(meth)acrylate, neopentyl glycol di(meth)acrylate, 1,10-decanediol di(meth)acrylate, pentaerythritol tri(meth)acrylate, pentaerythritol tetra(meth)acrylate, pentaerythritol hexa(meth)acrylate, dimethylol tricyclodecane di(meth)acrylate, triallylformal tri(meth)acrylate, allyl methacrylate, trimethylol propane tri(meth)acrylate, trimethylol propane triacrylate, tributanediol di(meth)acrylate, PEG #200 di(meth)acrylate, PEG #400 di(meth)acrylate, PEG #600 di(meth)acrylate, 3-acryloyloxyglycol monoacrylate, triacryl formal or triallyl isocyanate. If present, such crosslinking monomers preferably constitutes from about 0.1 to about 1 wt %, most preferably from about 0.2 to about 0.5 wt % of the total amounts of monomers for the polymer shell.

The propellant may, apart from isooctane, comprise up to totally 50 wt % of one or more of butanes, pentanes, hexanes, heptanes, petroleum distillates or other liquids with a suitable boiling point or boiling point range. Particularly preferred hydrocarbons for use in combination with isooctane are isobutane, isopentane, n-pentane, n-hexane, petroleum ether and n-heptane. Suitably the propellant is liquid at room temperature and has a boiling point at atmospheric pressure below the softening point of the polymer shell. Preferably the boiling point at atmospheric pressure is within the range from about −20 to about 150° C., most preferably from about 20 to about 100° C. It is particularly preferred that the propellant has a boiling point or boiling point range so a temperature above 50° C., more preferably above 60° C., most preferably above 70° C., but preferably not higher than about 150° C., would be required to evaporate at least 50 wt %, preferably at least 80 wt % of the propellant at atmospheric pressure. Preferably the propellant constitutes from about 10 to about 30 wt %, most preferably from about 15 to about 25 wt % of the total microsphere.

Apart from the polymer shell and the propellant the microspheres may comprise further substances added during the production thereof, normally in an amount from about 1 to about 20 wt %, preferably from about 2 to about 10 wt %. Examples of such substances are solid suspending agents, such as one or more of silica, chalk, bentonite, starch, crosslinked polymers, methyl cellulose, gum agar, hydroxypropyl methylcellulose, carboxy methylcellulose, colloidal clays, and/or one or more salts, oxides or hydroxides of metals like Al, Ca, Mg, Ba, Fe, Zn, Ni and Mn, for example one or more of calcium phosphate, calcium carbonate, magnesium hydroxide, barium sulphate, calcium oxalate, and hydroxides of aluminium, iron, zinc, nickel or manganese. If present, these solid suspending agents are normally mainly located to the outer surface of the polymer shell. Even if a suspending agent has been added during the production of the microspheres, this may have been washed off at a later stage and could thus be substantially absent from the final product.

The average particle size of the expandable microspheres is suitably from about 1 to about 500 µm, preferably from about 1 to about 200 µm, most preferably from about 3 to about 100 µm, most preferably from about 5 to about 50 µm. By heating to a temperature above $T_{start}$, it is normally possible to expand the microspheres from about 2 to about 7 times, preferably from about 4 to about 7 times, their diameter The invention further concerns a process for producing thermally expandable microspheres as described above, comprising the steps of polymerising ethylenically unsaturated monomers in an aqueous suspension in the presence of a propellant to yield microspheres comprising a homo- or co-polymer shell entrapping said propellant, wherein said ethylenically unsaturated monomers comprises more than 85 wt %, preferably more than 92 wt %, more preferably more than 95 wt %, most preferably more than 98 wt % of nitrile containing monomers, particularly most preferably substantially consists of nitrile containing monomers, while said propellant comprises at least, suitably more than 50 wt %, preferably more than 55 wt %, more preferably more than about 60 wt % most preferably more than about 70 wt % of isooctane, particularly most preferably substantially consists of isooctane.

Regarding preferred monomers, propellants and other features of the final product, the above description of the novel microspheres is referred to.

In applicable parts, the polymerisation may be conducted as described in the earlier mentioned patent publications regarding microspheres.

In a suitable, preferably batchwise procedure for preparing microspheres of the invention the polymerisation is conducted in a reaction vessel as described below. For 100 parts of monomer phase (suitably including monomers and propellant), one or more polymerisation initiator, preferably in an amount from about 0.1 to about 5 parts, aqueous phase, preferably in an amount from about 100 to about 800 parts, and one or more preferably solid colloidal suspending agent, preferably in an amount from about 1 to about 20 parts, are mixed and homogenised. The temperature is suitably set from about 40 to about 90° C., preferably from about 50 to about 80° C., while the suitable pH depends on the suspending agent used. For example, alkaline pH, preferably from about 7 to about 12, most preferably from about 8 to about 10, is suitable if the suspending agent is selected from salts, oxides or hydroxides of metals like Al, Ca, Mg, Ba, Fe, Zn, Ni and Mn, for example one or more of calcium phosphate, calcium carbonate, chalk, magnesium hydroxide, barium sulphate, calcium oxalate, and hydroxides of aluminium, iron, zinc, nickel or manganese, each one of these agents having different optimal pH depending on solubility data. Acidic pH, preferably from about 1 to about 6, most preferably from about 3 to about 5, is suitable if the suspending agent is selected from silica, bentonite, starch, methyl cellulose, gum agar, hydroxypropyl methylcellulose, carboxy methylcellulose, colloidal clays.

In order to enhance the effect of the suspending agent, it is also possible to add small amounts of one or more promoters, for example from about 0.001 to about 1 wt %. Usually, such promoters are organic materials and may, for example, be selected from one or more of water-soluble sulfonated polystyrenes, alginates carboxymethylcellulose, tetramethyl ammonium hydroxide or chloride or water-soluble complex resinous amine condensation products such as the water-soluble condensation products of diethanolamine and adipic acid, the water-soluble condensation products of ethylene oxide, urea and formaldehyde, polyethylenimine, amphoteric materials such as proteinaceous, materials like gelatin, glue, casein, albumin, glutin and the like, non-ionic materials like methoxycellulose, ionic materials normally classed as emulsifiers, such as soaps, alkyl sulfates and sulfonates and the long chain quaternary ammonium compounds.

Conventional radical polymerisation may be used and initiators are suitably selected from one or more of organic peroxides such as dialkyl peroxides, diacyl peroxides, peroxy esters, peroxy dicarbonates, or azo compounds. Suitable initiators include dicetyl peroxy dicarbonate, tert-butyl cyclohexyl peroxy dicarbonate, dioctanyl peroxide, dibenzoyl peroxide, dilauroyl peroxide, didecanoyl peroxide, tert-butyl peracetate, tert-butyl perlaurate, tert-butyl perbenzoate, tert-butyl hydroperoxide, cumene hydroperoxide, cumene ethylperoxide, diisopropyl hydroxy dicarboxylate, azo-bis dimethyl valeronitrile, azo-bis isobutyronitrile, azo-bis (cyclo hexyl carbo nitrile) and the like. It is also possible to initiate the polymerisation with radiation, such as high energy ionising radiation.

When the polymerisation is complete, microspheres are normally obtained as an aqueous slurry, which can be dewatered by any conventional means, such as bed filtering, filter pressing, leaf filtering, rotary filtering, belt filtering and centifuging, and then dried by any conventional means, such as spray drying, shelf drying, tunnel drying, rotary drying, drum drying, pneumatic drying, turbo shelf drying, disc drying and fluidised bed-drying.

The invention further concerns use of thermally expandable microspheres as described above as a foaming agent, particularly in materials like plastics, rubber and paint that have to be excerpted to high temperatures for processing before they are supposed to foam, which temperatures, for example, may be above about 115° C., particularly above about 130° C. The amount of micro spheres is preferably from about 0.1 to about 30 wt %, most preferably from about 0.5 to about 20 wt %. Examples of materials in which the novel microspheres advantageously are included are polyethylene, polypropylene, polystyrene, ABS (acrylonitrile butadiene styrene), which may be used for low weight high temperature processed products. Other examples include rubber for the tread surface of tyres, particularly of crude rubber and/or SBR (styrene butadiene rubber), or rubber for soles for shoes, particularly of TPU (thermoplastic uretanes), SBS (styrene butadiene styrene)

and/or SEBS (styrene ethylene butadiene styrene), or paint intended to be applied by high pressure.

Moreover, the invention concerns an expandable composition comprising thermally expandable microspheres as described above as a foaming agent, preferably in an amount from about 0.1 to about 30 wt %, most preferably from about 0.5 to about 20 wt %. The composition suitably further comprise one or more polymeric substances, for example an amount from about 70 to about 99.9 wt %, most preferably from about 80 to about 99.5 wt %, which polymeric substances may include one or more of polyethylene, polypropylene, polystyrene, ABS, SBS, SEBS, crude rubber, SBR, TPU or similar materials.

Finally, the invention concerns articles comprising a foamed material containing expanded microspheres obtainable by heating expandable microspheres as described above, preferably when included in a composition as described above. Examples of such articles are rubber tyres, soles for shoes and low weight high temperature processed products. The expandable microspheres have suitably been heated to a temperature from about 140 to about 260° C., preferably from about 140 to about 240° C., most preferably from about 150 to about 230° C., resulting in an increase in volume and decrease in density of the foamed material.

The invention will now be further described in connection with the following Examples, which, however, not should be interpreted as limiting the scope thereof. If not otherwise stated, all parts and percentages refer parts and percent by weight.

EXAMPLE 1

A dispersion of 7 parts of Mg(OH)$_2$ and 340 parts of water was prepared. A mixture of 2 parts of initiator, 60–65 parts of acrylo nitrile, 30–35 parts of methacrylo nitrile and 0.5–5.5 parts of one or two of a monofunctional, difunctional or trifunctional methacrylate monomer (given in table 1) and 21 parts of propellant (given in table 1) was added to form a reaction mixture, which then was homogenised to a suitable monomer droplet size. The initiator was one of dilauroyl peroxide (denoted I in table 1) or 2,2'-azobis (isobutyronitrile) (denoted II in table 1). After homogenization, the mixture was transferred to a 300 ml bottle which was sealed and heated while agitating the mixture during polymerisation. After 15–20 hours at 60–65° C. the microspheres obtained were filtered, washed and dried. Expansion of the microspheres was measured in a temperature ramping experiment in a Mettler-Toledo Thermomechanical Analyser. The results are shown in Table 1. It appears that when at least 50 wt % isooctane is used as propellant both high $T_{start}$ and low density at high temperature (220° C.) could be obtained.

TABLE 1

| Propellant | Initiator | Methacrylate monomers | Nitrile containing monomers (wt %) | Tstart (° C.) | Tmax (° C.) | Bulk density at 220° C. (g/l) |
|---|---|---|---|---|---|---|
| 100% IP | I | TMPTMA | 99.5% | 111 | 190 | 22.0 |
| 100% IP | I | EGDMA | 99.5% | 110 | 192 | 12.7 |
| 100% IP | I | BDDM | 99.5% | 111 | 188 | 23.1 |
| 100% NP | I | TMPTMA | 99.5% | 112 | 185 | 35.0 |
| 100% NP | I | EGDMA | 99.5% | 117 | 182 | 60.7 |
| 100% NP | I | BDDM | 99.5% | 117 | 184 | 40.8 |
| 100% SBP 60/95 | I | TMPTMA | 99.5% | 128 | 197 | 16.0 |
| 100% SBP 60/95 | II | TMPTMA | 99.5% | 155 | 195 | 17.2 |
| 100% SBP 60/95 | I | EGDMA | 99.5% | 127 | 197 | 22.1 |
| 100% SBP 60/95 | I | BDDM | 99.5% | 137 | 197 | 17.8 |
| 100% NH | I | TMPTMA | 99.5% | 177 | 213 | 30.0 |
| 100% NH | I | EGDMA | 99.5% | 152 | 217 | 13.3 |
| 100% NH | I | BDDM | 99.5% | 148 | 215 | 14.3 |
| 100% NO | I | TMPTMA | 99.5% | 204 | 212 | 58.0 |
| 100% NO | I | EGDMA | 99.5% | 197 | 212 | 65.2 |
| 100% NO | I | BDDM | 99.5% | 206 | 221 | 44.8 |
| 100% IO | I | TMPTMA | 99.5% | 178 | 216 | 11.0 |
| 100% IO | II | TMPTMA | 99.5% | 179 | 203 | 10.5 |
| 100% IO | I | EGDMA | 99.5% | 145 | 218 | 10.4 |
| 100% IO | I | BDDM | 99.5% | 155 | 218 | 8.2 |
| 100% IO | I | TMPTMA, MMA | 97.5% | 148 | 217 | 14 |
| 100% IO | I | TMPTMA, MMA | 94.5% | 147 | 217 | 13 |
| 100% IO | I | BDDM, MMA | 94.5% | 158 | 219 | 11 |
| 100% IO | I | BDDM, EMA | 94.5% | 175 | 218 | 12.6 |
| 100% IO | I | TMPTMA, EMA | 94.5% | 169 | 218 | 12.8 |
| 100% IO | I | EGDMA, MMA | 94.5% | 159 | 218 | 16.3 |
| 100% IO | I | EGDMA, EMA | 94.5% | 156 | 219 | 16.5 |
| 90% IO, 10% IP | I | TMPTMA | 99.5% | 149 | 211 | 9 |
| 90% IO, 10% NP | I | TMPTMA | 99.5% | 151 | 211 | 9 |
| 83% IO, 17% SBP 60/95 | I | TMPTMA | 99.5% | 173 | 212 | 12 |
| 83% IO, 17% SBP 60/95 | I | EGDMA | 99.5% | 144 | 215 | 11 |
| 83% IO, 17% SBP 60/95 | I | BDDM | 99.5% | 145 | 215 | 10 |
| 83% IO,17% IP | I | TMPTMA | 99.5% | 140 | 203 | 10 |
| 83% IO,17% IP | I | EGDMA | 99.5% | 134 | 204 | 10 |
| 83% IO, 17% IP | I | BDDM | 99.5% | 128 | 205 | 10 |
| 67% IO, 33% SBP 60/95 | I | TMPTMA | 99.5% | 157 | 208 | 12 |

TABLE 1-continued

| Propellant | Initiator | Methacrylate monomers | Nitrile containing monomers (wt %) | Tstart (° C.) | Tmax (° C.) | Bulk density at 220° C. (g/l) |
|---|---|---|---|---|---|---|
| 67% IO, 33% SBP 50/95 | I | EGDMA | 99.5% | 138 | 212 | 13 |
| 67% IO, 33% IP | I | TMPTMA | 99.5% | 128 | 198 | 12 |
| 67% IO, 33% IP | I | EGDMA | 99.5% | 123 | 195 | 11 |
| 67% IO, 33% IP | I | BDDM | 99.5% | 124 | 199 | 10 |
| 67% IO, 33% NP | I | TMPTMA | 99.5% | 133 | 197 | 9 |
| 50% IO, 50% SBP 60/95 | I | TMPTMA | 99.5% | 153 | 205 | 14 |
| 50% IO, 50% SBP 60/95 | I | EGDMA | 99.5% | 137 | 208 | 16 |
| 50% IO, 50% SBP 60/95 | I | BDDM | 99.5% | 135 | 208 | 12 |
| 50% IO, 50% IP | I | TMPTMA | 99.5% | 118 | 191 | 15 |
| 50% IO, 50% IP | I | EGDMA | 99.5% | 117 | 192 | 12 |
| 50% IO, 50% IP | I | BDDM | 99.5% | 116 | 198 | 11 |
| 50% IO, 50% NP | I | TMPTMA | 99.5% | 131 | 194 | 11 |

IO = isooctane; IP = isopentane; NP = n-pentane; SBP 60/95 = petroleum destillate with boiling point range of 60–95° C.; NH = n-heptane; NO = n-octane; MMA = methyl methacrylate; EMA = ethyl methacrylate; TMPTMA = trimetylolpropane trimethacrylate; EGDMA = ethylene glycol dimethacylate; BDDM = butane diol dimethacrylate

EXAMPLE 2

Microspheres prepared in Example 1 with a polymer shell made from 99.5% nitrile containing monomers and 100% isooctane as propellant were mixed into SBS thermoplastic rubber in a total amount of 2.75 wt %. The microsphere containing rubber mixture was injection moulded with a barrel temperature of 210–225° C. and an injection speed of 70–150 mm/s to square-shaped plates. The density of the plates was measured, and found to be lowered from 996 g/l to 729 g/l by introducing the microspheres.

As a comparison, this experiment was repeated with microspheres with a polymer shell made from 99.5% nitrile containing monomers and 100% isopentane as propellant. The density of the plates was found to be lowered from 996 g/l to 857 g/l by introducing the microspheres. Furthermore, a discoloration of the material was found in comparison to the material containing isooctane.

What is claimed is:

1. Thermally expandable microspheres comprising a thermoplastic polymer shell and a propellant entrapped therein, wherein said polymer shell is made of a homo- or co-polymer from ethylenically unsaturated monomers comprising more than 85 wt % nitrile containing monomers and said propellant comprises at least 50 wt % isooctane.

2. Microspheres as claimed in claim 1, wherein said ethylenically unsaturated monomers comprise more than 92 wt % nitrite containing monomers.

3. Microspheres as claimed in claim 2, wherein said ethylenically unsaturated monomers comprise more than 95 wt % nitrite containing monomers.

4. Microspheres as claimed in claim 3, wherein said ethylenically unsaturated monomers comprise more than 98 wt % nitrite containing monomers.

5. Microspheres as claimed in claim 1, wherein said nitrite containing monomers mainly are selected from the group consisting of acrylo nitrile, methacrylo nitrile and mixtures thereof.

6. Microspheres as claimed in claim 1, wherein said polymer shell also comprise crosslinking multifunctional monomers.

7. Microspheres as claimed in claim 6, wherein said crosslinking monomers constitutes from about 0.1 to about 1 wt % of the total amounts of monomers for the polymer shell.

8. Microspheres as claimed in claim 6, wherein said crosslinking monomers are selected from the group consisting of divinyl benzene, ethylene glycol di(meth)acrylate, diethylene glycol di(meth)acrylate, triethylene glycol di(meth)acrylate, propylene glycol di(meth)acrylate, 1,4-butanediol di(meth)acrylate, 1,6-hexanediol di(meth) acrylate, glycerol di(meth)acrylate, 1,3-butanediol di(meth) acrylate, neopentyl glycol di(meth)acrylate, 1,10-decanediol di(meth)acrylate, pentaerythritol tri(meth)acrylate, pentaerythritol tetra(meth)acrylate, pentaerythritol hexa(meth) acrylate, dimethylol tricyclodecane di(meth)acrylate, triallylformal tri(meth)acrylate, allyl methacrylate, trimethylol propane tri(meth)acrylate, trimethylol propane triacrylate, tributanediol di(meth)acrylate, PEG #200 di(meth)acrylate, PEG #400 di(meth)acrylate, PEG #600 di(meth)acrylate, 3-acryloyloxyglycol monoacrylate, triacryl formal and triallyl isocyanate.

9. Microspheres as claimed in claim 1, wherein the softening temperature of said polymer shell is within the range from about 80 to about 200° C.

10. Microspheres as claimed in claim 1, wherein said propellant comprises more than 55 wt % isooctane.

11. Microspheres as claimed in claim 10, wherein said propellant comprises more than about 60 wt % isooctane.

12. Microspheres as claimed in claim 11, wherein said propellant comprises more than about 70 wt % isooctane.

13. Microspheres as claimed in claim 12, wherein said propellant substantially consists of isooctane.

14. Microspheres as claimed in claim 1, wherein said propellant comprises isooctane and one or more substance selected from the group consisting of isobutane, isopentane, n-pentane, n-hexane, petroleum ether and n-heptane.

15. Microspheres as claimed in claim 1, wherein said propellant has a boiling point or boiling point range so a temperature above 50° C. would be required to evaporate at least 50 wt % of the propellant at atmospheric pressure.

16. Microspheres as claimed in claim 1, wherein the average particle size is from about 1 to about 500 μm.

17. Microspheres as claimed in claim 1, wherein $T_{start}$ is within the range from about 80 to about 200° C.

18. Thermally expandable microspheres having an average particle size from about 1 to about 500 μm and comprising a thermoplastic polymer shell and a propellant entrapped therein, wherein said polymer shell is made of a homo- or co-polymer from ethylenically unsaturated monomers comprising more than 92 wt % nitrile containing monomers and said propellant comprises at least 50 wt % isooctane.

19. Process for producing thermally expandable microspheres comprising polymerising ethylenically unsaturated monomers in an aqueous suspension in the presence of a propellant to yield microspheres comprising a hollow homo- or co-polymer shell entrapping said propellant wherein said ethylenically unsaturated monomers comprises more than 85 wt % of nitrile containing monomers and said propellant comprises more than 50 wt % of isooctane.

20. Expandable composition comprising one or more polymeric substances and, as a foaming agent, thermally expandable microspheres comprising a thermoplastic polymer shell and a propellant entrapped therein, wherein said polymer shell is made of a homo- or co-polymer from ethylenically unsaturated monomers comprising more than 85 wt % nitrile containing monomers and said propellant comprises at least 50 wt % isooctane.

* * * * *

UNITED STATES PATENT AND TRADEMARK OFFICE
CERTIFICATE OF CORRECTION

PATENT NO.   : 6,509,384 B2           Page 1 of 1
DATED        : January 21, 2003
INVENTOR(S)  : Anna Kron, Peter Sjogren and Odd Bjerke It is certified that error appears in the above-identified patent and that said Letters Patent is hereby corrected as shown below:

Column 7,
Lines 46, 50, 53, 56 and 57, "nitrite" is changed to -- nitrile --.

Signed and Sealed this

Second Day of September, 2003

JAMES E. ROGAN
*Director of the United States Patent and Trademark Office*